(No Model.)

O. M. ALLABEN.
DITCHING MACHINE.

No. 280,112. Patented June 26, 1883.

WITNESSES:
Chas. Nidg.
C. Sedgwick

INVENTOR:
O. M. Allaben
BY Munn & Co
ATTORNEYS.

UNITED STATES PATENT OFFICE.

ORSON M. ALLABEN, OF MARGARETVILLE, NEW YORK.

DITCHING-MACHINE.

SPECIFICATION forming part of Letters Patent No. 280,112, dated June 26, 1883.

Application filed August 4, 1882. (No model.)

*To all whom it may concern:*

Be it known that I, ORSON M. ALLABEN, of Margaretville, in the county of Delaware and State of New York, have invented a new and useful Improvement in Ditching-Machines, of which the following is a full, clear, and exact description.

Reference is to be had to the accompanying drawings, forming part of this specification, in which similar letters of reference indicate corresponding parts in both the figures.

Figure 1:
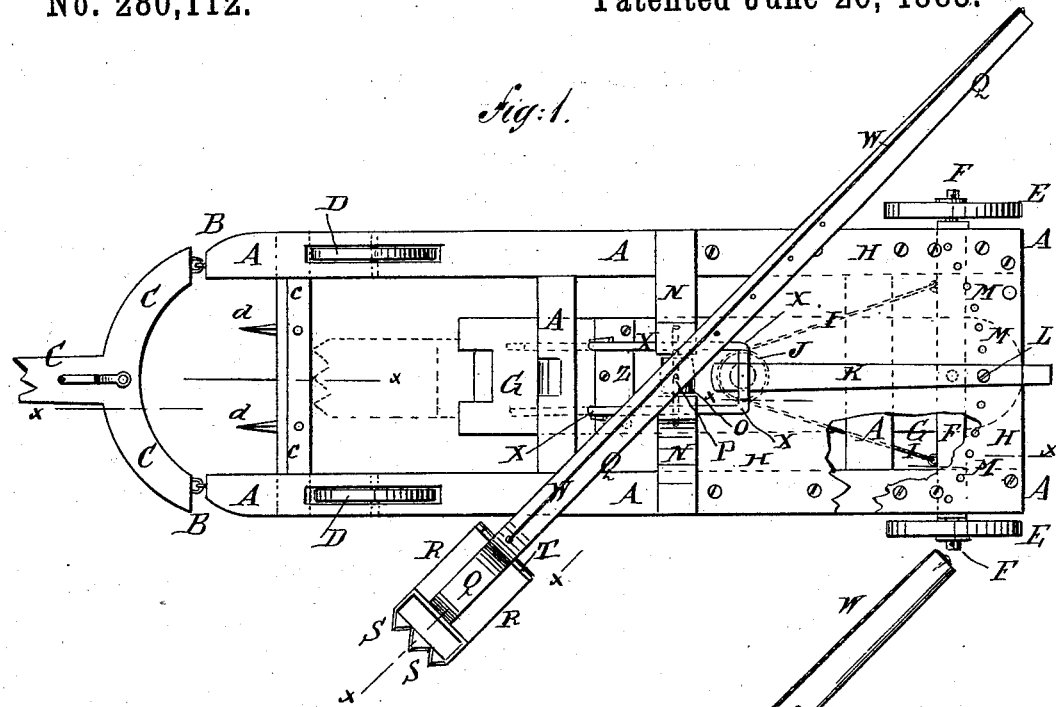
Figure 2:
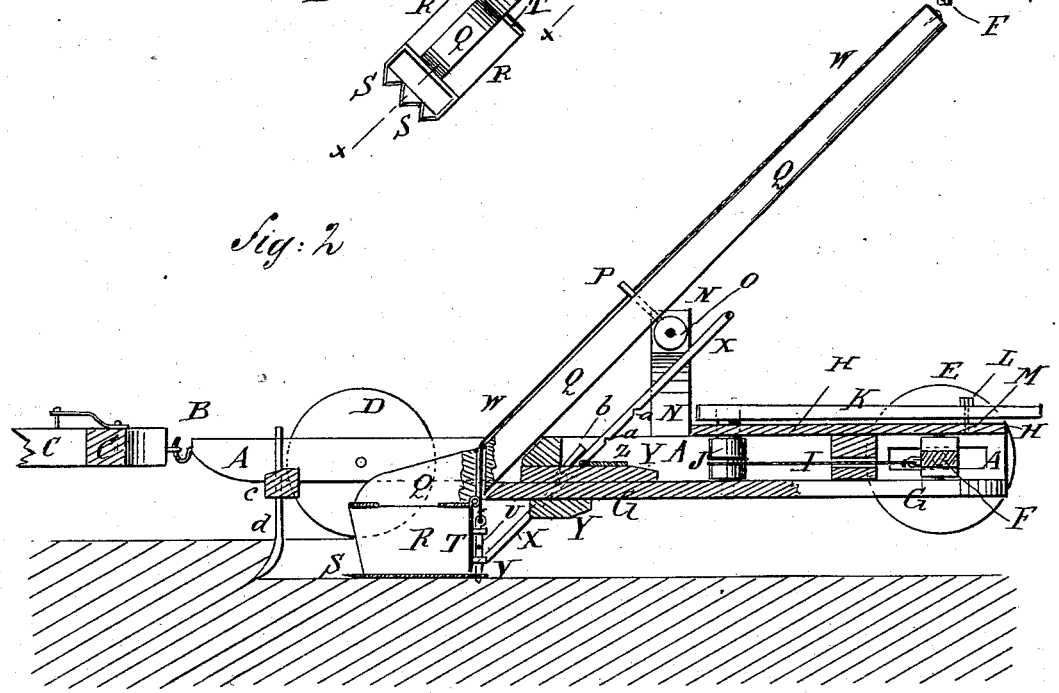

Figure 1 is a plan view of my improvement, part being broken away, and the shovel being shown turned to one side. Fig. 2 is a sectional side elevation of the same, taken through the line *x x x x x x*, Fig. 1, the shovel being shown in working position.

The object of this invention is to facilitate the digging of open ditches for surface draining.
The invention consists in a ditching-machine constructed with a frame having a plank attached to its lower side, a platform attached to its upper side, and provided with a pivoted axle controlled by two cords attached to a drum operated by a lever for directing the course of the machine. To the middle part of the side bars of the machine-frame are attached two bars carrying a roller provided with a pin to pivot the handle of the shovel.
The shovel is made with a hinged door at its rear end, fastened by a bolt and catch, and the said bolt is provided with a cord for drawing it up to release the door and discharge the soil. The shovel is supported against the resistance of the soil by adjustable brace-rods secured in place by a plate and wedges, as will be hereinafter fully described.

A represents the frame of the machine, which is formed of two side bars connected a little in front of their centers and at a little distance from their rear ends by two crossbars.

To the forward ends of the side bars of the frame A is hinged, by any suitable couplings, B, the forked rear end of the tongue C, to which the draft is applied, and by means of which the machine is controlled.

D are the forward wheels, which are pivoted in slots in the forward parts of the side bars of the frame A.

E are the rear wheels, the axle F of which passes through slots in the rear parts of the side bars of the frame A, and which is pivoted at its center to and between the plank G, attached to the lower side of the crossbars of the frame A, and the platform H, attached to the upper sides of the rear crossbar and the side bars of the said frame A, so that the said axle can be turned upon its pivot to guide the machine.

To the end parts of the axle F are attached the rear ends of two cords or chains, I, which pass through slots in the rear cross-bar of the frame A, and at their forward ends are attached to and wound in opposite directions around a short vertical drum, J. The drum J is pivoted to and between the plank G and platform H, and to its upper journal is attached the forward end of the lever K, which extends back along the platform H to the rear end of the machine. With this construction the wheels E can be readily turned to guide the machine or to set the machine to work in a curved line. The lever K is secured in any position into which it may be adjusted by a pin, L, which passes through it and into one or another of the holes M formed in the rear part of the platform H in the arc of a circle having its center in the axis of the drum J.

To the side bars of the frame A, a little in the rear of their centers, are attached the lower ends of two standards, N, which are curved or inclined inward and upward until their upper ends nearly meet above the central line of the machine, and to and between the said upper ends is pivoted a short roller, O.

To one side of the roller O is rigidly attached a pin, P, which passes through a hole in the shovel-handle Q, so that the said shovel-handle will have a vertical and a lateral movement. Several holes are formed in the handle Q to receive the pin P, so that the said handle can be readily adjusted as the ditch increases in depth. The lower end of the handle Q projects forward, and is attached to the top of the shovel R, or to cross-bars attached to the said top. The shovel R is made open in front and rear, and to the forward edge of its bottom are attached or upon it are formed teeth S, which are made in V shape, so that they can be more easily forced forward into the soil. The upper sides of the teeth S can be made convex or V-shaped, so that they can be more easily forced upward through the soil when the shovel has been filled. The rear end of the shovel R is closed by a door, T, which is hinged at its top edge to the rear edge of the top of the shovel R, or of a bar attached to the said top. The door T is held closed by a bolt, U, which slides in keepers attached to the outer side of the said door, and engages with a catch, V, attached to the rear edge of the bottom of the shovel R. The lower end of the bolt U and the catch V are beveled, so that the said door will fasten itself when swung shut.

To the upper end of the bolt U is attached the lower end of the cord W, which passes through a guide-hole in the handle Q, passes up along the upper side of the said handle, and its outer end is secured to the outer part of the handle Q, so that the man that operates the shovel can conveniently unbolt the door T to discharge the contents of the shovel R by drawing upon the cord W. When the shovel R is in position to be forced forward into the soil the lower part of the handle Q rests in a notch in the forward end of the plank G and in the forward upper corner of the forward cross-bar of the frame A. The shovel R is supported against the resistance of the soil by the rods X, which pass down through holes in the plank G into such positions that the lower part of the door T will rest against the lower ends of the said rods X. I prefer to connect the upper ends of the rods X, or to make them in one piece for convenience in adjusting them, and to secure accuracy in their adjustment.

The plank G can be strengthened against the pressure of the rod X by blocks Y, attached to the upper and lower sides of the part of the said plank through which the said rods pass. The rods X are held against being pressed upward by the pressure of the shovel R by a plate, Z, attached to the upper side of the plank G, or of a block, Y, attached to the said plank in such a position that its forward edge will engage with notches $a$, formed in the rear side of the said rods X, the said rods being held against the edge of the said plate by wedges $b$, driven along the sides of the said rods into the holes in the plank G or block Y, through which the rods pass.

In using the machine a hole is dug in the ground of sufficient size and depth to receive the shovel R, so that the said shovel will fill itself with soil when the machine is drawn forward. When the shovel R is full, the team is stopped, and the said shovel is raised and swung to one side of the machine, and the cord W is pulled to unfasten the door T and discharge the contents of the said shovel, the said contents falling upon the ground at a sufficient distance from the ditch to be out of the way of the machine in its subsequent passages. The shovel is then swung back into the ditch, and the team is started to again fill the shovel, and so on, the machine being drawn forward and back along the ditch until the said ditch has been sunk to the required depth.

To the lower side of the forward ends of the side bars of the frame A are attached the ends of the cross-bar $c$, to which are attached two colters, $d$, in such positions as to be in line with the sides of the ditch. The colters $d$ are designed to be used, when digging the first course in a ditch, to cut through the sod, and thus make the work of the shovel easier. After the first course has been dug, the cross-bar $c$ and colters $d$ are detached, as the said cross-bar would be in the way of the shovel R when the handle Q is adjusted downward.

I am aware that a brace having its upper end adjustably secured to the frame and its lower end resting against a scraper has heretofore been employed in a ditching-plow, and I therefore do not claim such invention.

Having thus fully described my invention, I claim as new and desire to secure by Letters Patent—

1. A ditching-machine constructed substantially as herein shown and described, and consisting of the frame A, having plank G and platform H, the forward wheels, D, the rear wheels, E, the pivoted axle F, the cords or chains I, drum J, and lever K for guiding the machine, the standards N, the roller O, having pin P, the handle Q, the shovel R, having hinged door T, the bolt and catch U V, the trip-cord W, and the brace-rods X, as set forth.

2. In a ditching-plow, the combination, with the frame A, having its side beams slotted, the plank G, and the platform H, of the rear axle, F, pivoted at its center between the said plank and platform, the drum J, the cords I, attached to the axle and drum, and the lever K, substantially as and for the purpose set forth.

3. In a ditching-machine, the combination, with the frame A and the plank G, of the inclined standards N, the roller O, having pin P, the shovel-handle Q, and the shovel R, substantially as herein shown and described, whereby the dirt can be readily loosened and raised from the ditch, as set forth.

4. In a ditching-machine, the combination, with the frame A, the standards N, and the roller O, having pin P, of the shovel-handle Q, the shovel R, provided with the hinged door T, and means for securing and releasing said door, substantially as herein shown and described, and for the purpose set forth.

5. In a ditching-machine, the combination, with the plank G and the shovel R, of the adjustable brace-rods X, having notches $a$, the plate Z, and wedges $b$, substantially as herein shown and described, whereby the said shovel will be supported against the resistance of the soil, as set forth.

O. M. ALLABEN.

Witnesses:
  O. S. DECKER,
  G. G. DECKER.